US009232425B2

(12) United States Patent
Burhan et al.

(10) Patent No.: US 9,232,425 B2
(45) Date of Patent: Jan. 5, 2016

(54) METHODS AND DEVICES FOR INCREASING DATA THROUGHPUT BY SCHEDULING OF POWER MEASUREMENTS IN A WIRELESS COMMUNICATIONS SYSTEM

(71) Applicant: Qualcomm Incorporated, San Diego, CA (US)

(72) Inventors: Abeezar A. Burhan, Middlesex (GB); Mungal Singh Dhanda, Slough (GB); Kishore Kumar Yannakula, Farnborough (GB); Divaydeep Sikri, Woking (GB); Philip John Charles Children, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 13/664,377

(22) Filed: Oct. 30, 2012

(65) Prior Publication Data
US 2014/0064113 A1 Mar. 6, 2014

Related U.S. Application Data

(60) Provisional application No. 61/697,145, filed on Sep. 5, 2012.

(51) Int. Cl.
*H04W 24/00* (2009.01)
*H04W 24/10* (2009.01)
(Continued)

(52) U.S. Cl.
CPC .............. *H04W 24/10* (2013.01); *H04W 48/20* (2013.01); *H04W 36/0088* (2013.01)

(58) Field of Classification Search
None
See application file for complete search history.

(56) References Cited

U.S. PATENT DOCUMENTS

| 6,044,270 A  * | 3/2000 | Raith ............................. 455/434 |
| 6,377,803 B1 * | 4/2002 | Ruohonen ..................... 455/434 |
| 6,470,024 B1 * | 10/2002 | Hamalainen et al. ......... 370/459 |

(Continued)

FOREIGN PATENT DOCUMENTS

| EP | 0853439 A2 | 7/1998 |
| EP | 2437529 A1 | 4/2012 |

(Continued)

OTHER PUBLICATIONS

International Search Report and Written Opinion—PCT/US2013/058264—ISA/EPO—Jan. 21, 2014.

*Primary Examiner* — Hassan Kizou
*Assistant Examiner* — Tejis Daya

(57) ABSTRACT

Access terminals are adapted to receive and transmit data during one or more frames in a multiframe. Power measurements for a neighboring cell can be scheduled during one or more frames not intended for power measurements. In some examples, the one or more frames not intended for power measurements can include an Idle frame and/or a Packet Timing Advance Control Channel (PTCCH) frame in a 52-frame multiframe structure, as well as an Idle frame and/or a Slow Associated Control Channel (SACCH) frame in a 26-frame multiframe structure. Some access terminals may be adapted for facilitating multiple subscriptions, and may operate at least substantially simultaneously in a Connected mode subscription and an Idle mode subscription. In such instances, a neighboring cell for which power measurements are performed may be associated with the Connected mode subscription and/or the Idle mode subscription. Other aspects, embodiments, and features are also claimed and described.

32 Claims, 7 Drawing Sheets

(51) Int. Cl.
*H04W 48/20* (2009.01)
*H04W 36/00* (2009.01)

(56) References Cited

U.S. PATENT DOCUMENTS

| | | |
|---|---|---|
| 7,020,102 B2 * | 3/2006 | Tuomainen et al. ........... 370/311 |
| 7,330,732 B2 * | 2/2008 | Wilborn et al. ............... 455/502 |
| 2003/0026228 A1 | 2/2003 | Jyrkka |
| 2003/0202574 A1 * | 10/2003 | Budka et al. .................. 375/227 |
| 2005/0032542 A1 | 2/2005 | Wilborn et al. |
| 2005/0113087 A1 * | 5/2005 | Rick et al. ..................... 455/434 |
| 2005/0239472 A1 * | 10/2005 | Wei ............................ 455/452.2 |
| 2007/0141990 A1 * | 6/2007 | Zeng et al. .................... 455/63.1 |
| 2010/0142498 A1 * | 6/2010 | Hyounhee ..................... 370/337 |
| 2012/0057525 A1 | 3/2012 | Hou |
| 2012/0088501 A1 | 4/2012 | Chin et al. |
| 2012/0135715 A1 | 5/2012 | Kang et al. |
| 2012/0149361 A1 | 6/2012 | Esch et al. |
| 2013/0083737 A1 * | 4/2013 | Earnshaw et al. ............. 370/329 |

FOREIGN PATENT DOCUMENTS

| | | |
|---|---|---|
| EP | 2472960 A1 | 7/2012 |
| WO | WO-9427385 A1 | 11/1994 |
| WO | 2012089634 A1 | 7/2012 |

* cited by examiner

R – Receive
T – Transmit
M – Power Measure

R – Receive
T – Transmit
M – Power Measure
P – Paging Channel Monitoring

R – Receive
T – Transmit
M – Power Measure
P – Paging Channel Monitoring

B0 – B11 = Radio Blocks
T = PTCCH Frame
X = Idle Frame

B0 – B5 = Radio Blocks
S = SACCH Frame
X = Idle Frame

R – Receive
T – Transmit

R – Receive
T – Transmit
P – Paging Channel Monitoring

– Slot used for timing advance

☐ – Slots available for pwr measurement

METHODS AND DEVICES FOR INCREASING DATA THROUGHPUT BY SCHEDULING OF POWER MEASUREMENTS IN A WIRELESS COMMUNICATIONS SYSTEM

CROSS REFERENCE TO RELATED APPLICATION & PRIORITY CLAIM

This patent application claims benefit of and priority to U.S. Provisional Patent Application No. 61/697,145, filed 5 Sep. 2012, which is hereby incorporated by reference in its entirety and as if fully set forth below and for all applicable purposes.

TECHNICAL FIELD

The following relates generally to wireless communication, and more specifically to methods and devices for facilitating improved throughput at access terminals in a wireless communications system by performing power measurements of neighboring cells during non-standard frames.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

As access terminals operate within the wireless communications system, each access terminal may periodically measure one or more parameters of neighboring cells. Such measurements, which may be referred to generally as power measurements, can be employed in determining whether an access terminal should remain on its current cell or switch to a different cell. Typically, a wireless communications system will have predetermined periods when such measurements are scheduled to occur.

BRIEF SUMMARY OF SOME EXAMPLES

In some instances, it may be beneficial to measure one or more parameters of a neighboring cell during periods that differ from the periods when such measurements are conventionally scheduled. Various features and aspects of the present disclosure are adapted to enable an access terminal to perform measurements for one or more neighboring cells during periods that differ from when such measurements are conventionally scheduled. According to one or more examples of the present disclosure, access terminals may include a communications interface and a storage medium in electrical communications with a processing circuit. The processing circuit is adapted to transceive data via the communications interface during one or more frames in a multiframe. The processing circuit may perform a power measurement for a neighboring cell during at least one other frame, where the at least one other frame is not intended for power measurements.

Further aspects provide methods operational on an access terminals and/or access terminals including means to perform such methods. One or more examples of such methods may include transceiving data during one or more frames in a multiframe. Transceiving data can include receiving data and/or transmitting data. A power measurement is performed for at least one neighboring cell during at least one other frame, where the at least one other frame is not intended for power measurements. A neighboring cell may include a neighboring cell associated with a Connected mode subscription and/or a neighboring cell associated with an Idle mode subscription.

Still further aspects include computer-readable mediums comprising programming operational on an access terminal. According to one or more examples, such programming may be adapted for transmitting and/or receiving data during one or more frames of a multiframe, and for performing a power measurement for at least one neighboring cell during at least one other frame. The at least one other frame includes a frame not intended for power measurements.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the disclosure are described below for GSM and GPRS systems, and related terminology may be found in much of the following description. However, those of ordinary skill in the art will recognize that one or more aspects of the present disclosure may be employed and included in one or more other wireless communication protocols and systems.

Figure 1:
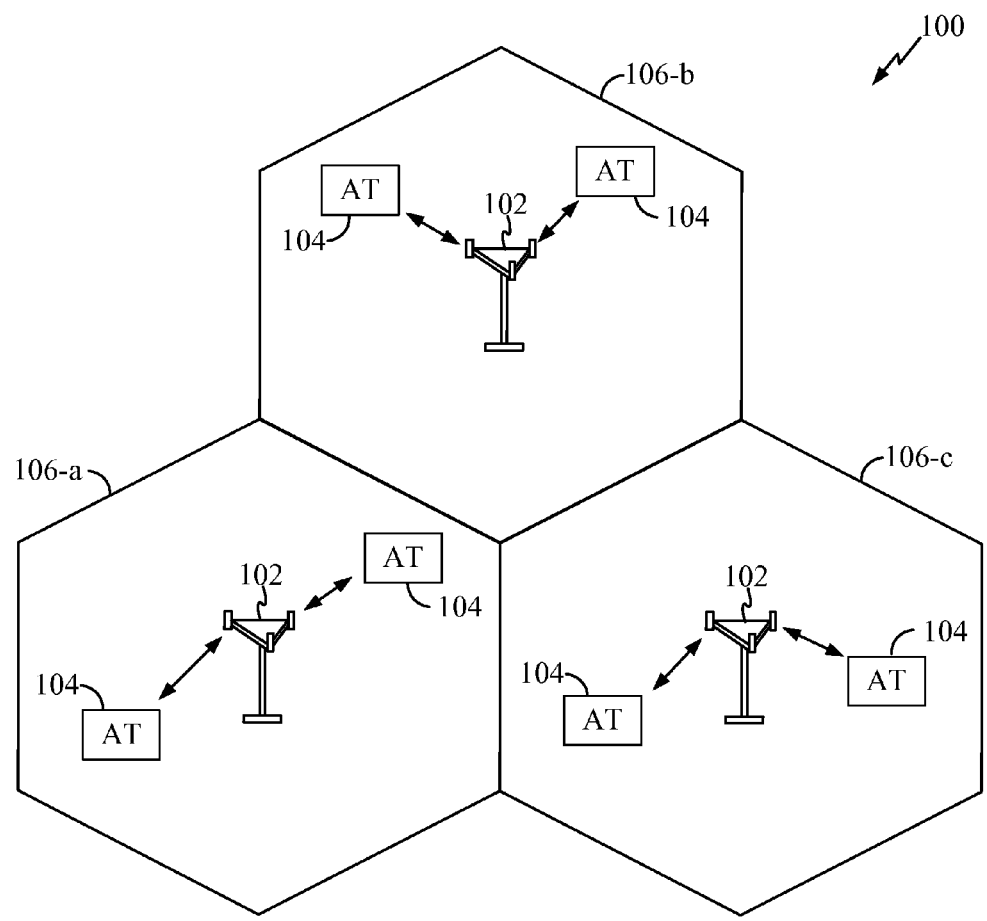
FIG. 1 is a block diagram illustrating an example of a network environment in which one or more aspects of the present disclosure may find application.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-*a*, 106-*b*, or 106-*c*. The coverage area 106 for a base station 102 may be divided into sectors (not shown, but making up only a portion of the coverage area). The system 100 may include base stations 102 of different types (e.g., macro, micro, and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

Figure 2:
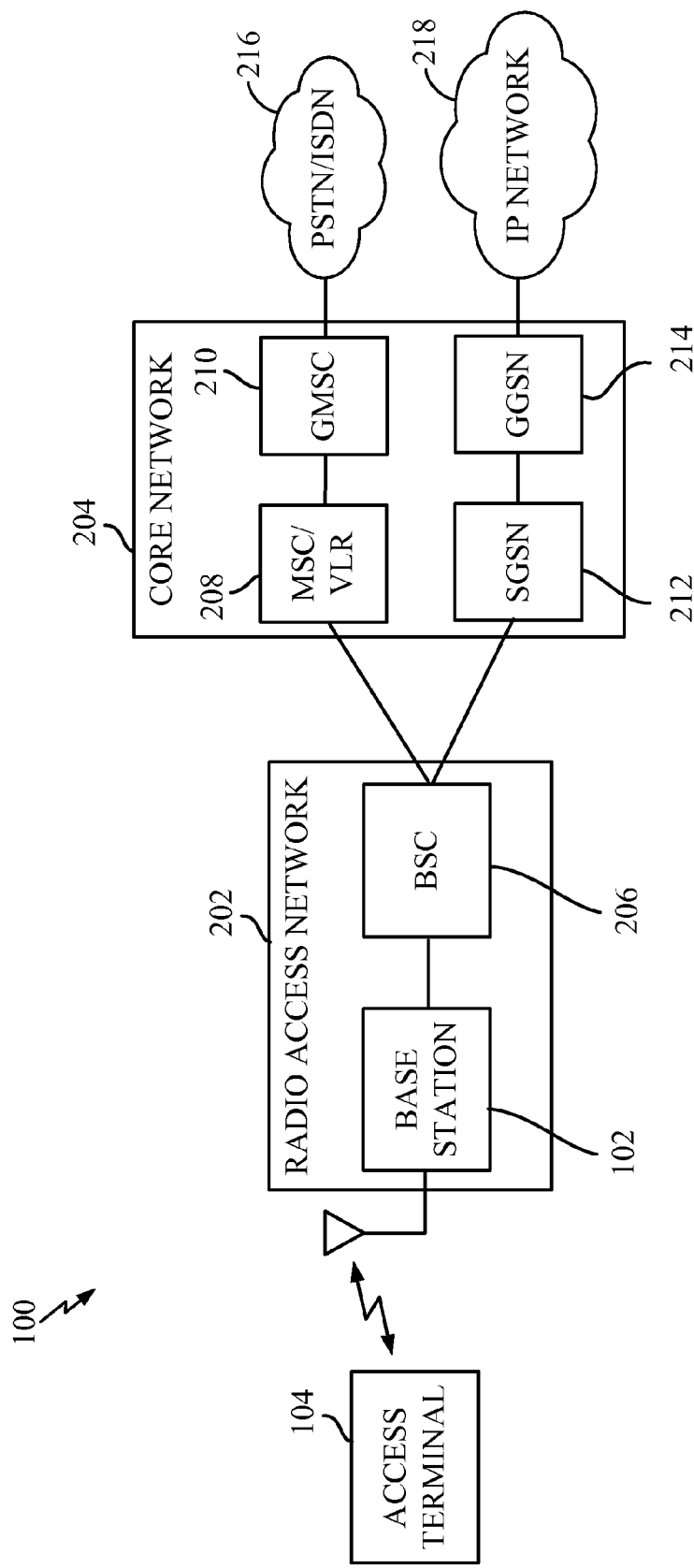
FIG. 2 is a block diagram illustrating select components of the wireless communication system of FIG. 1 according to at least one example.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As an access terminal 104 operates within the wireless communications system 100, the access terminal 104 may be connected with a serving cell (e.g., a serving base station 102), and may monitor one or more neighboring cells (e.g., neighboring base stations 102). The particular neighboring cells monitored by the access terminal 104 may be identified by the network. For instance, the serving cell may transmit a list of one or more neighboring cells which the access terminal 104 should monitor while connected to the serving cell.

Figure 3:
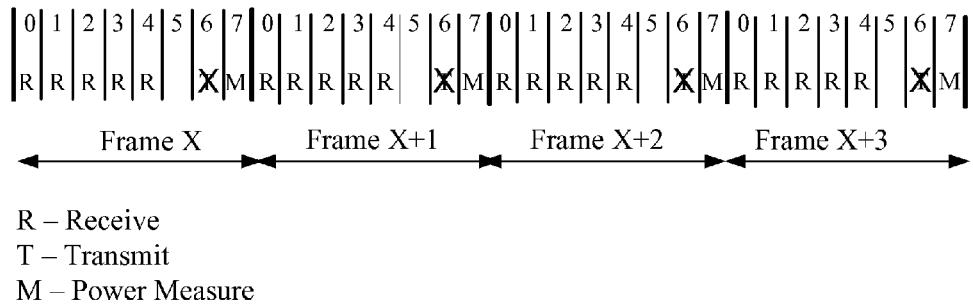
FIG. 3 is a block diagram depicting four frames of a radio block according to an example where an access terminal is scheduled to perform power measurements of one or more neighboring cells during an eighth timeslot of each frame.

In some instances, an access terminal 104 may be adapted to support a single subscription (e.g., a single subscriber identity module (SIM)). Such an access terminal 104 may be scheduled to monitor one or more neighboring cells during a particular predefined time. For example, FIG. 3 is a block diagram depicting four frames of a radio block in a multi-frame structure. Each of the four frames, frame X, frame X+1, frame X+2 and frame X+3, includes eight timeslots, labeled by numbers 0 through 7. The example in FIG. 3 may represent 52-frame multiframe structure with a higher multi-slot class 33, where each frame includes five reception slots (labeled with an 'R') and one transmission slot (labeled with a 'T'). A power measurement (labeled at 'M') is scheduled in each frame during timeslot 7.

The opportunity to perform the power measurements is affected by the time it takes the access terminal 104 to tune to the particular measurement frequency. Based on the access terminal's 104 capability and the RF tune times when doing power measurements in the illustrated timeslot, the access terminal 104 typically cancels one or more surrounding timeslots. For example, in the illustrated example, the single slot in timeslot 7 between the transmission slot (T) in timeslot 6 and the receive slot (R) in timeslot 0 of the next frame may not be a sufficient time period for the access terminal 104 to tune from a transmit frequency to a measurement frequency, perform the scheduled power measurements (M) in timeslot 7, and then tune from the measurement frequency to a receive frequency. As a result, the access terminal 104 may cancel the scheduled transmission slot (T) in timeslot 6 (as indicated by the crossed-out T) in order to perform the scheduled power measurements (M) in timeslot 7. Similarly, if the power measurements were scheduled in another timeslot, such as timeslot 4, the access terminal 104 may cancel the receive slots (R) in timeslots 3 and 4 in order to perform a scheduled power measurement (M) in timeslot 4. Such cancellations can lead to lower packet data throughput at the access terminal 104.

In addition to access terminals 104 adapted for supporting a single SIM, some access terminals 104 may be adapted to support a plurality of subscriptions (e.g., via a plurality of subscriber identity modules (SIMs)). An access terminal 104 with multiple subscription capabilities (e.g., multiple SIMs) may be able to use multiple services without the need to carry multiple access terminals 104 at the same time. For example, the same access terminal 104 can be used for business and private use with separate numbers and separate bills, or for travel when an additional SIM is employed for a visited country. Some multiple subscription configurations enable each subscription to be active simultaneously, allowing calls to be received on either number at any given time (e.g., Dual SIM Dual Standby (DSDS), Dual SIM Dual Active).

In such configurations, when the access terminal 104 is actively operating in a Connected mode for one subscription, which may be referred to as the Connected mode subscription, the access terminal 104 can monitor the paging channel (PCH) for the other subscription, which may be referred to as the Idle mode subscription. The Connected mode may include operations in a dedicated mode, a transfer mode (or packet transfer mode), and/or a dual transfer mode. While the access terminal 104 conducts packet transfer in the Connected mode subscription (e.g., GERAN Packet Transfer in a packet transfer mode), it can tune away to the Idle mode subscription's BCCH frequency (e.g., align frame timing to the BCCH associated with the Idle mode subscription) to read the page block. In addition to reading the page block, such access terminals 104 are typically adapted to schedule power measurements for the neighboring cells associated with the Idle mode subscription to retain mobility and be reachable by the network associated with the Idle mode subscription. These power measurements are conventionally scheduled to occur at the same time as when the paging channel (PCH) is monitored to conserve battery life.

Figure 4:
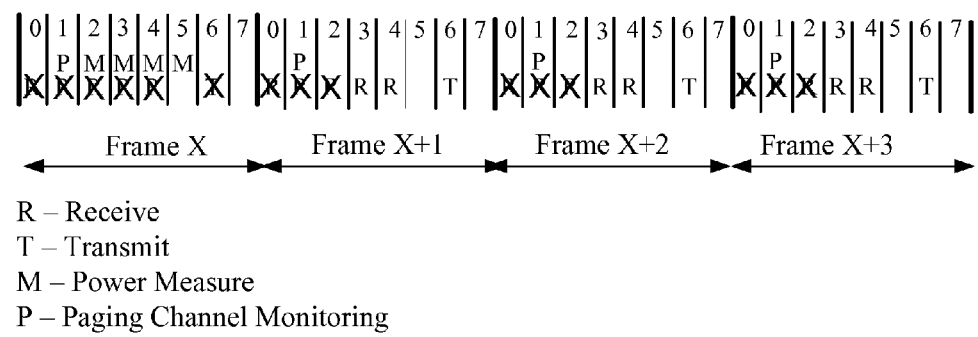
FIG. 4 is a block diagram depicting four frames of a radio block according to an example where an access terminal monitors a paging channel on an Idle mode subscriptions while carrying on packet transfer in a Connected mode subscription.
Figure 5:
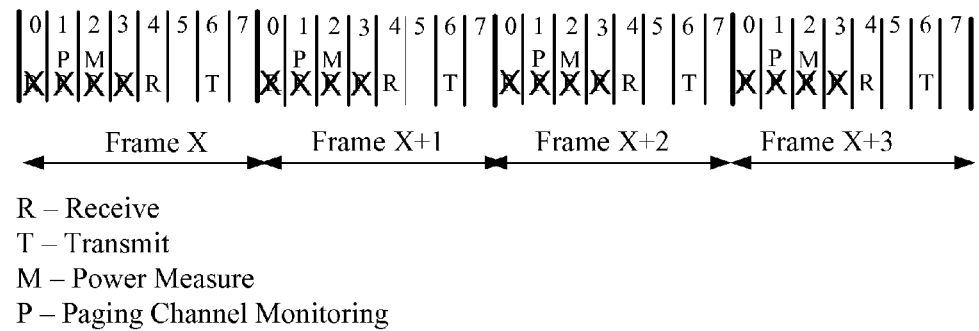
FIG. 5 is a block diagram depicting four frames of a radio block according to another example where an access terminal monitors a paging channel on an Idle mode subscriptions while carrying on packet transfer in a Connected mode subscription.

FIGS. 4 and 5 are block diagrams depicting four frames of a radio block when an access terminal monitors a paging channel on an Idle mode subscription while carrying on packet transfer in a Connected mode subscription. In the example of FIG. 4, the access terminal 104 is scheduled to monitor a paging channel (P) on an Idle mode subscription during timeslot 1 of the Connected mode subscription. The access terminal 104 further performs power measurements (M) during timeslots 2 through 5 of the first frame (Frame X) immediately after the page read (P) in timeslot 1. As a result of the time it takes the access terminal 104 to tune from the Connected mode subscription to the Idle mode subscription, timeslot 0 in the first frame (Frame X) is cancelled in addition to the cancellation of timeslots 1 through 5. Similarly, the time it takes to tune from the Idle mode subscription back to the Connected mode subscription results in the cancellation of timeslot 6 of the first frame (Frame X) as well. Thus, in the first frame (Frame X) in FIG. 4, all of the timeslots 0 through 6 are missed in the Connected mode subscription. For the remaining frames, Frame X+1, Frame X+2 and Frame X+3, where only a page read (P) occurs on the Idle mode subscription in timeslot 1 of the Connected mode subscription, timeslots 0 through 3 are cancelled.

In the example of FIG. 5, the access terminal 104 is similarly scheduled to monitor a paging channel (P) on the Idle mode subscription during timeslot 1 of the Connected mode subscription. In this example, however, a power measurement (M) is scheduled in timeslot 2 of each frame. As a result of the time it takes the access terminal 104 to tune from the Connected mode subscription to the Idle mode subscription, timeslot 0 is cancelled in addition to the cancellation of timeslots 1 and 2. Similarly, the time it takes to tune from the Idle mode subscription back to the Connected mode subscription results in the cancellation of timeslot 3 in each frame (Frame X) as well. Thus, the timeslots 0 through 3 are missed in the Connected mode subscription for each of the frames.

As depicted in the examples in FIGS. 4 and 5, when the combined page read and power measurements are done during activities on the Connected mode subscription (e.g., packet transfer mode activities), the access terminal 104 misses one or more timeslots on one or more frames in the Connected mode subscription. Typically, a radio block consists of four RF bursts, with each RF burst transmitted or received during one timeslot. By missing the one or more timeslots in the Connected mode subscription, the packet data throughput is negatively impacted. In instances where the access terminal 104 uses a modulation and coding scheme such as MCS-1 through MCS-6, loss of two or more RF bursts of a radio block resulting from cancellation of two or more reception or two or more transmission timeslots may result in loss of the radio block. In instances where the access terminal 104 uses a higher modulation and coding scheme, such as MCS-7, MCS-8, MCS-9, the loss of one or more RF bursts in the Connected mode subscription are likely to result in complete loss of the radio block.

Figure 6:
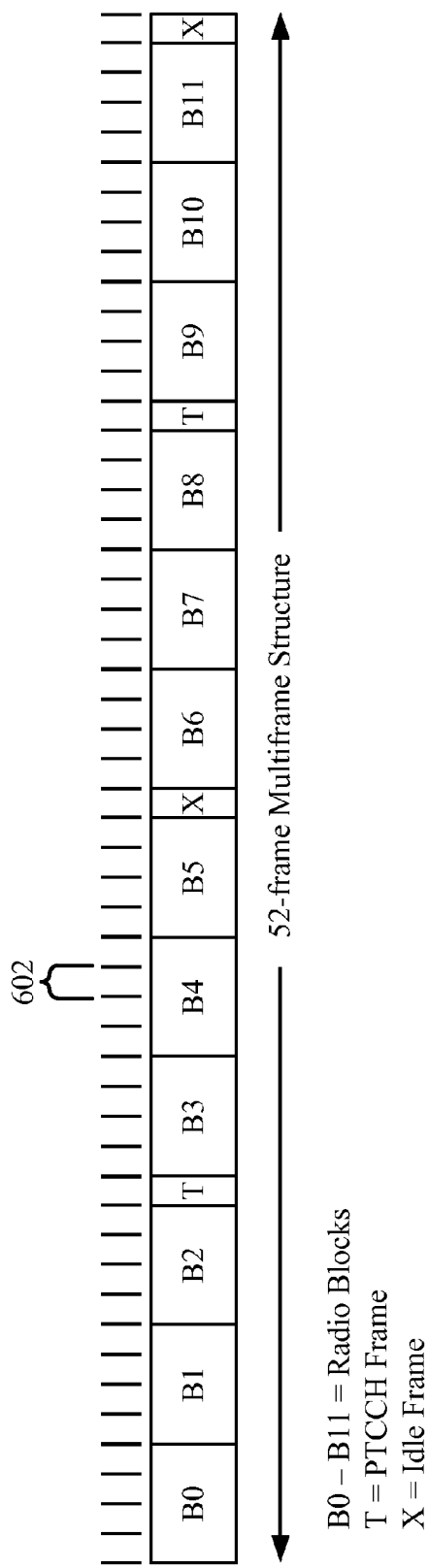
FIG. 6 is a block diagram illustrating a 52-frame multiframe structure according to at least one example.

According to at least one aspect of the present disclosure, access terminals are adapted to employ timeslots from one or more frames in a multiframe structure for performing power measurements, where the one or more frames are conventionally employed for activities other than power measurement activities. For example, in conventional GPRS wireless communications, a multiframe structure including 52 TDMA frames may be employed, while GSM may employ a multiframe structure including 26 TDMA frames. FIG. 6 shows a block diagram of a 52-frame multiframe structure according to at least one example. The 52-frame multiframe structure is employed by access terminals operating in a GPRS packet transfer mode and includes twelve radio blocks (B0 through B11), two Idle frames (X), and two Packet Timing Advance Control Channel (PTCCH) frames (T). The radio blocks each typically include four frames 602, where each frame 602 includes eight timeslots, as illustrated in FIGS. 3-5. The four frames 602 in each radio block are typically intended for power measurements in addition to transmission and reception of data from the network. The idle frames (X) are typically used by an access terminal to perform Frequency Correction Channel (FCCH) activities, Synchronization Channel (SCH) activities, inter-RAT measurements, and interference measurements. The Packet Timing Advance Control Channel (PTCCH) frames (T) are typically used for continuous timing advance procedures to derive the correct value for timing advance that the access terminal has to use for the uplink transmission of radio blocks as well as interference measurements.

Figure 7:
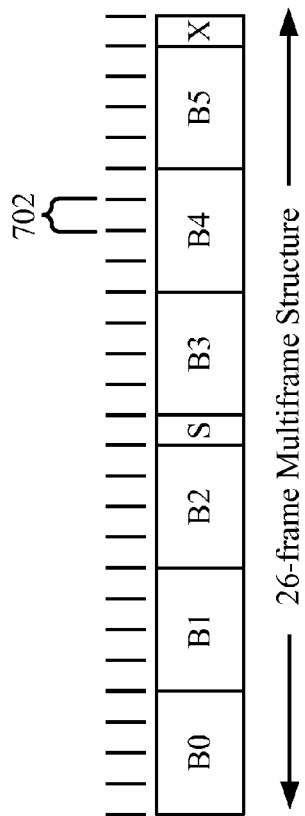
FIG. 7 is a block diagram illustrating a 26-frame multiframe structure according to at least one example.

FIG. 7 shows a block diagram of a 26-frame multiframe structure according to at least one example. The 26-frame multiframe structure is employed by access terminals operating in dedicated mode and includes six radio blocks (B0 through B5), one Slow Associated Control Channel (SACCH) frame (S), and one Idle frame (X). The radio blocks each include four frames 702, where each frame 702 includes eight timeslots. In some instances, an access terminal may also operate in a dual transfer mode. Dual transfer mode enables the access terminal to synchronize circuit-switched and packet-switched features of a GSM/GPRS network to facilitate simultaneous use of GSM and GPRS functionality. When operating in dual transfer mode, the access terminal employs the 52-frame multiframe in FIG. 6 for packet-switched operations and the 26-frame multiframe in FIG. 7 for circuit-switched operations.

According to at least one example, an access terminal of the present disclosure can employ timeslots from one or more Idle frames (X) and/or one or more Packet Timing Advance Control Channel (PTCCH) frames (T) in a 52-frame multiframe structure for performing power measurements of neighboring cells. In other examples, such an access terminal can employ timeslots from the Idle frame (X) and/or the Slow Associated Control Channel (SACCH) frame (S) in a 26-frame multiframe structure for performing power measurements of neighboring cells.

Figure 8:
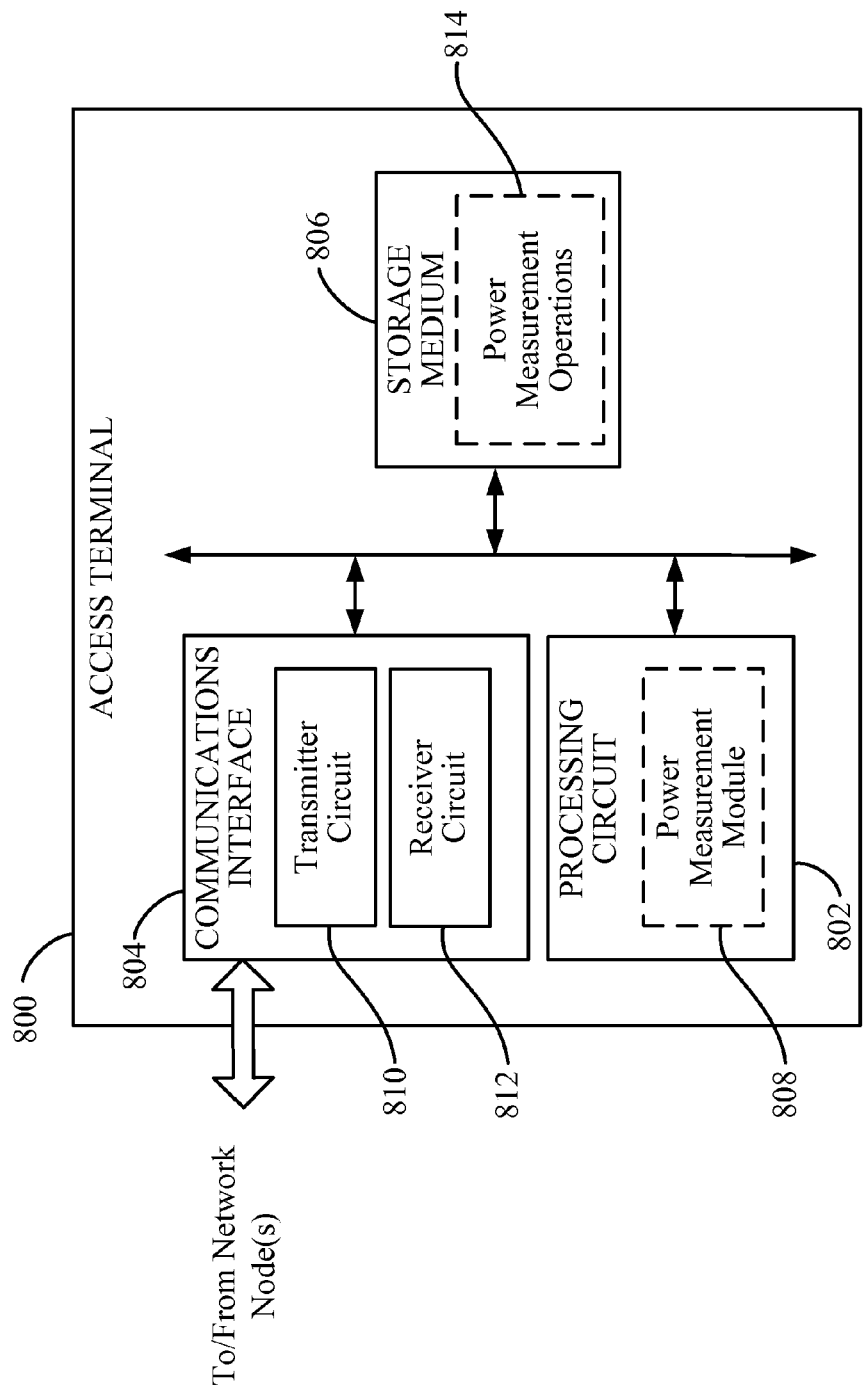
FIG. 8 is a block diagram illustrating select components of an access terminal according to at least one example.

FIG. 8 is a block diagram illustrating select components of an access terminal 800 according to at least one example of the present disclosure. The access terminal 800 may include a processing circuit 802 coupled to or placed in electrical communication with a communications interface 804 and a storage medium 806.

The processing circuit 802 is arranged to obtain, process and/or send data, control data access and storage, issue commands, and control other desired operations. The processing circuit 802 may include circuitry configured to implement desired programming provided by appropriate media in at least one example. For example, the processing circuit 802 may be implemented as one or more processors, one or more controllers, and/or other structure configured to execute executable programming Examples of the processing circuit 802 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 802 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 802 are for illustration and other suitable configurations within the scope of the present disclosure are also contemplated.

The processing circuit 802 is adapted for processing, including the execution of programming, which may be stored on the storage medium 806. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 802 may include a power measurement module 808. The power measurement module 808 may include circuitry and/or programming (e.g., programming stored on the storage medium 806) adapted to, among other things, perform power measurements for one or more neighboring cells during one or more timeslots in a frame that is not intended for power measurements.

The communications interface 804 is configured to facilitate wireless communications of the access terminal 800. For example, the communications interface 804 may include circuitry and/or programming adapted to facilitate the communication of information bi-directionally with respect to one or more network nodes. The communications interface 804 may be coupled to one or more antennas (not shown), and includes wireless transceiver circuitry, including at least one transmitter circuit 810 (e.g., one or more transmitter chains) and/or at least one receiver circuit 812 (e.g., one or more receiver chains).

The storage medium 806 may represent one or more computer-readable, machine-readable, and/or processor-readable devices for storing programming, such as processor executable code or instructions (e.g., software, firmware), electronic data, databases, or other digital information. The storage medium 806 may also be used for storing data that is manipulated by the processing circuit 802 when executing programming. The storage medium 806 may be any available media that can be accessed by a general purpose or special purpose processor, including portable or fixed storage devices, optical storage devices, and various other mediums capable of storing, containing or carrying programming. By way of example and not limitation, the storage medium 806 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 806 may be coupled to the processing circuit 802 such that the processing circuit 802 can read information from, and write information to, the storage medium 806. That is, the storage medium 806 can be coupled to the processing circuit 802 so that the storage medium 806 is at least accessible by the processing circuit 802, including examples where the storage medium 806 is integral to the processing circuit 802 and/or examples where the storage medium 806 is separate from the processing circuit 802 (e.g., resident in the access terminal 800, external to the access terminal 800, distributed across multiple entities).

Programming stored by the storage medium 806, when executed by the processing circuit 802, causes the processing circuit 802 to perform one or more of the various functions and/or process steps described herein. For example, the storage medium 806 may include power measurement operations (or instructions) 814. The power measurement operations 814 can be implemented by the processing circuit 802 in, for example, the power measurement module 808 to perform power measurements for at least one neighboring cell during at least one timeslot in at least one non-power-measurement frame of a multiframe (e.g., at least one frame of the multiframe which is intended for one or more activities other than power measurement activities). Thus, according to one or more aspects of the present disclosure, the processing circuit 802 may be adapted to perform (in conjunction with the storage medium 806) any or all of the processes, functions, steps and/or routines for any or all of the access terminals described herein (e.g., access terminal 104 or 800). As used herein, the term "adapted" in relation to the processing circuit 802 may refer to the processing circuit 802 being one or more of configured, employed, implemented, or programmed to perform a particular process, function, step and/or routine according to various features described herein.

In operation, the access terminal 800 is adapted to employ one or more frames for performing power measurements for one or more neighboring cells, where the one or more frames are not intended for power measurement activities.

Figure 9:
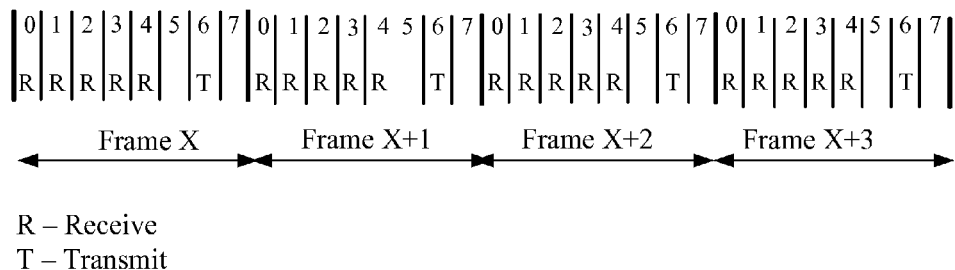
FIG. 9 is a block diagram depicting four frames of a radio block according to an example where an access terminal schedules power measurements of one or more neighboring cells during a frame not intended for power measurements.

When the access terminal 800 is operating with a single subscription (e.g., a single SIM), the access terminal 800 may employ a frame not intended for power measurement activities to perform power measurements. For instance, in the example depicted in FIG. 3, the power measurements are scheduled to occur in timeslot 7 of each frame of the illustrated radio block (e.g., a radio block B0-B11 in FIG. 6). Instead of performing these power measurements during a timeslot of the radio block, the access terminal 800 is adapted to schedule the power measurements in another frame not typically intended for power measurement activities. In this manner, the scheduled transmission timeslot (e.g., timeslot 6) is not cancelled, as shown in FIG. 9, and the access terminal 800 can employ the timeslot 6 in each frame for transmitting data to the network. As shown in FIG. 9, there are no cancelled timeslots in this example, which can increase data throughput in comparison to the example in FIG. 3 where the timeslot 6 was cancelled in each frame.

Figure 10:
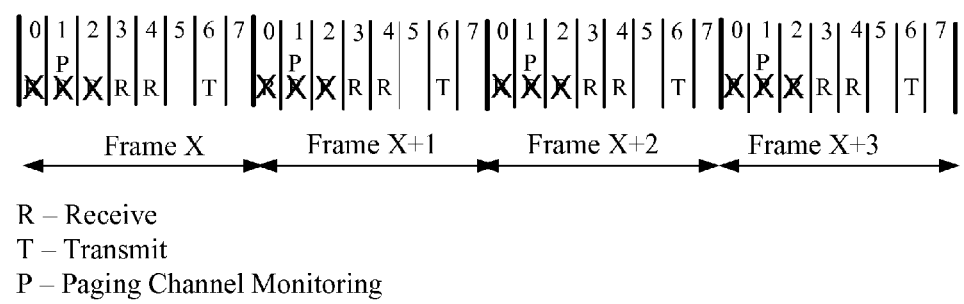
FIG. 10 is a block diagram depicting four frames of a radio block according to an example where an access terminal monitors a paging channel on an Idle mode subscriptions while carrying on packet transfer in a Connected mode subscription, and where power monitoring is scheduled during a frame in the Connected mode subscription not intended for power measurements.

When the access terminal 800 is adapted to operate with multiple subscriptions (e.g., multiple SIMs), the access terminal 800 may employ a frame not intended for power measurement activities to perform power measurements for a Connected mode subscription and/or an Idle mode subscription. For example, with reference to FIG. 10, the access terminal 800 may be scheduled to monitor (P) a paging channel (PCH) on an Idle mode subscription during the timeslot 1 of the frames for the Connected mode subscription. In this example, however, the access terminal 800 monitors the paging channel (PCH) without performing power measurements of neighboring cells associated with the Idle mode subscription. Accordingly, FIG. 10 does not show any power measurements during any of the frames Frame X, Frame X+1, Frame X+2 or Frame X+3. As a result of scheduling the power measurements on the Idle mode subscription during another frame, only the timeslots 0 through 3 of each frame on the Connected mode subscription are cancelled to tune to the Idle mode subscription, monitor the paging channel (PCH) of the idle mode subscription, and tune back to the Connected mode subscription. In this example, two reception timeslots, timeslots 3 and 4, are still available in each frame for receiving transmissions. In some instances, such as when one of the modulation and coding schemes MCS-1 through MCS-6 is used in good signal conditions, the access terminal 800 may be able to decode a received radio block from just the two RF bursts that may be received in timeslots 3 and 4.

In the multiple subscription example, the power measurements for the Connected mode subscription and/or the Idle mode subscription may be performed during one or more timeslots in a frame of the Connected mode subscription not typically intended for power measurement activities. In some instances, the power measurements for the neighboring cells associated with the Idle mode subscription may be performed by the Connected mode subscription so the tuning between the Connected mode subscription and the Idle mode subscription can be eliminated for power measurements. In other words, during the frame of the Connected mode subscription not typically intended for power measurements, the Connected mode subscription can perform power measurements for the Connected mode subscription and/or the Idle mode subscription.

Frames that are not intended for power measurement activities include frames of a multiframe structure which are intended for activities other than power measurements. For example, in the 52-frame multiframe structure shown in FIG. 6, the Idle frames (X) are typically intended for Frequency Correction Channel (FCCH) activities, Synchronization Channel (SCH) activities, inter-RAT measurements, and interference measurements. Similarly, the Packet Timing Advance Control Channel (PTCCH) frames (T) are typically intended for interference measurements and adjusting the timing advance to ensure that messages arrive at the correct time at the base station regardless of the distance of the access terminal 800 from the base station. Accordingly, Idle frames and PTCCH frames in a 52-frame multiframe structure represent frames which are not intended for power measurement activities.

Similarly, in the 26-frame multiframe structure shown in FIG. 7, the Slow Associated Control Channel (SACCH) frames (S) are typically intended for reporting signal quality measurements of the serving cell and neighboring cells to the network, for receiving power control commands, and for timing advance control. Additionally, although the Idle frame in a 26-frame multiframe structure may be employed for power measurement activities, this Idle frame is not intended for power measurement activities on another subscription. In other words, the Idle frame in a 26-frame multiframe in a Connected mode subscription is not intended for power measurement activities for an Idle mode subscription.

According to at least some examples of the present disclosure, the Idle frames and/or PTCCH frames in the 52-frame multiframe structure may be employed by the access terminal 800 for performing the power measurements. Furthermore, the SACCH frames in the 26-frame multiframe structure may be employed by the access terminal for performing the power measurements, and the Idle frames in the 26-frame multiframe structure may be employed by a Connected mode subscription on the access terminal for performing power measurements for an Idle mode subscription.

Figure 11:
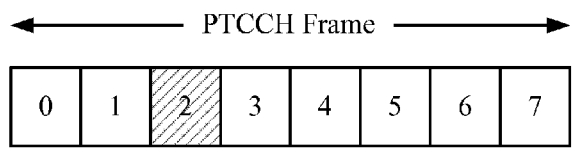
FIG. 11 is a block diagram showing the timeslots 0 through 7 of a Packet Timing Advance Control Channel (PTCCH) frame
Figure 11:

There are sixteen PTCCH frames in every eight 52-frame multiframes (e.g., two PTCCH frames in each 52-frame multiframe). Typically, only five PTCCH frames of the sixteen PTCCH frames are used. Out of the five used PTCCH frames, four PTCCH frames only use one slot to receive and one PTCCH frame uses just one slot to transmit. Thus, for every eight multiframes, eleven PTCCH frames are unused with eight timeslots available for use in power measurements, while five PTCCH frames include seven timeslots that are available for power measurements. FIG. 11 is a block diagram showing the timeslots 0 through 7 of a Packet Timing Advance Control Channel (PTCCH) frame (e.g., the PTCCH frame labeled as 'T' in FIG. 6) in which the timeslot 2 is employed by the access terminal 800 for packet timing advance activities. The access terminal 800 is adapted to use one or more of the remaining seven timeslots (0, 1, and 3 through 7) for power measurements. In an unused PTCCH frame, the access terminal 800 can use all eight of the timeslots for power measurements. Thus, the access terminal 800 can employ one or more of the unused timeslots of a PTCCH frame to perform power measurements of one or more neighboring cells when employing a 52-frame multiframe structure, such as during packet transfer mode in GPRS communications.

Like the PTCCH frame in the 52-frame multiframe structure, the SACCH frame in the 26-frame multiframe structure typically uses only a few of the eight timeslots at fixed intervals. Accordingly, the access terminal 800 is adapted to use one or more of the unused timeslots for power measurements of one or more neighboring cells when employing a 26-frame multiframe structure, such as during dual transfer mode.

Figure 12:
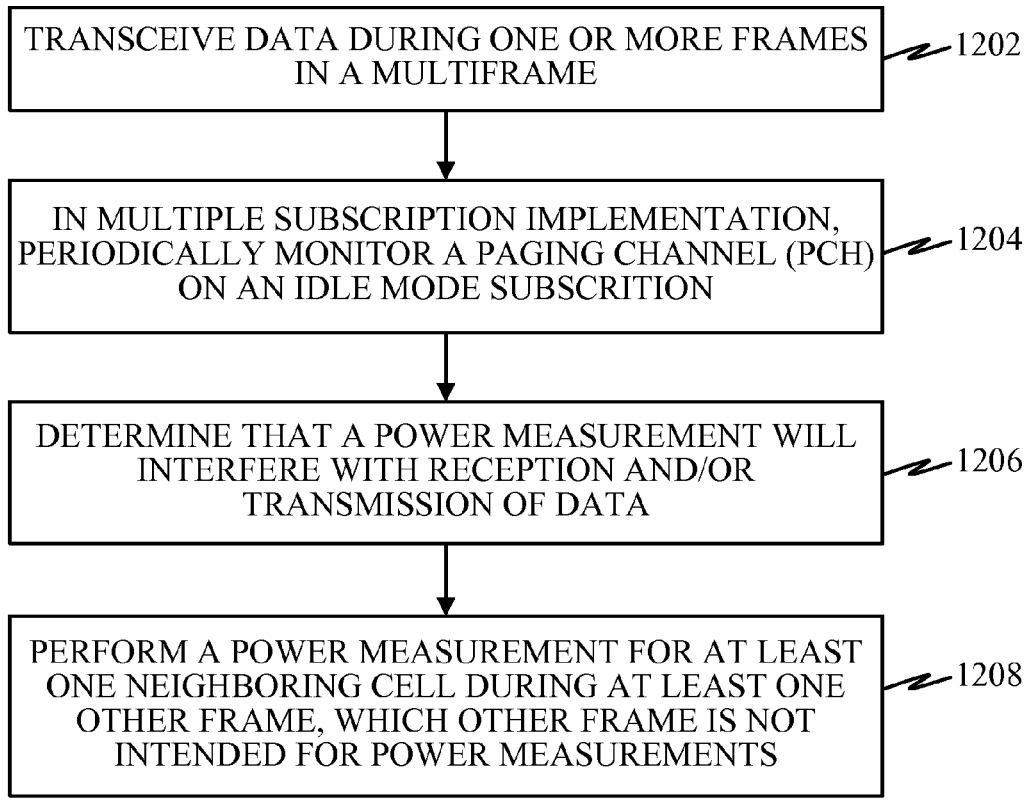
FIG. 12 is a flow diagram illustrating an example of a method operational on an access terminal according to at least one example.

Turning to FIG. 12, a flow diagram is illustrated showing at least one example of a method operational on an access terminal, such as the access terminal 800. With reference to FIGS. 8 and 12, an access terminal 800 can transceive data during one or more frames in a multiframe at step 1202. As used herein, transceiving data includes the transmission and/or reception of data. Thus, the access terminal 800 can transmit and/or receive data during one or more frames in a multiframe. For example, the processing circuit 802 may receive and/or transmit data via the communications interface 804 during one or more frames in a multiframe. In some instances, the processing circuit 802 may receive data during one or more timeslots in a particular frame via the receiver circuit 812, and/or may transmit data during one or more timeslots in the frame via the transmitter circuit 810. In some examples, the processing circuit 802 can receive and/or transmit the data during one or more frames in a radio block.

When the access terminal 800 employs multiple subscriptions (e.g., multiple SIMs), the reception and/or transmission of the data may occur on a subscription operating in a connected mode (e.g., the Connected mode subscription). In such a multiple subscription implementation, the access terminal 800 may periodically monitor a paging channel (PCH) on an Idle mode subscription while the Connected mode subscription operates in the connected mode at step 1204. The connected mode can include a packet transfer mode, a dedicated mode and/or a dual transfer mode. The processing circuit 802 can tune the communications interface 804 (e.g., align the frame timing of the communications interface 804) from the Connected mode subscription to the Idle mode subscription to monitor the paging channel (PCH) associated with the Idle mode subscription. Following a paging channel read, the processing circuit 802 can tune the communications interface 804 (e.g., align the frame timing of the communications interface 804) back to the Connected mode subscription to continue receiving and/or transmitting data as described at step 1202. If the access terminal 800 is not employing multiple subscriptions, the step 1204 may be skipped.

At step 1206, the access terminal 800 may determine that a power measurement will interfere with reception and/or transmission of data. For example, in the multiple subscription implementation, the processing circuit 802 (e.g., the power measurement module 808) executing the power measurement operations 814 can determine whether a power measurement on the Idle mode subscription can be performed in connection with monitoring the paging channel (PCH) without negatively impacting transmission and/or reception of data on the Connected mode subscription. The impact to transmission and/or reception may depend on the modulation and coding scheme employed.

As noted above, when received or transmitted data employs a modulation and coding scheme such as MCS-1 through MCS-6, the cancellation of two or more reception timeslots or two or more transmission timeslots may result in loss of the transmitted or received data. When received or transmitted data employs a higher modulation and coding scheme, such as MCS-7, MCS-8, MCS-9, the loss of one or more reception timeslots or one or more transmission timeslots may result in a loss of the transmitted or received data. Accordingly, the processing circuit 802 (e.g., the power measurement module 808) executing the power measurement operations 814 can determine whether performing power measurements on the Idle mode subscription in connection with monitoring the paging channel will result in a cancellation of a number of transmission slots or reception slots on the Connected mode subscription such that a loss of data is likely.

By way of example only, if monitoring the paging channel (PCH) on the Idle mode subscription will result in cancellation of two out of four reception timeslots in each frame on the Connected mode subscription, and the modulation and coding scheme is MCS-1, MCS-2, MCS-3, MCS-4, MCS-5 or MCS-6, then the processing circuit 802 (e.g., the power measurement module 808) executing the power measurement operations 814 may determine that monitoring the paging channel (PCH) may still allow for successful reception of data during each frame. If the processing circuit 802 (e.g., the power measurement module 808) executing the power measurement operations 814 determines that performing the power measurements in connection with the PCH monitoring will result in the loss of one or more additional reception timeslots, then the determination can be made that the power measurements will interfere with the reception of data and negatively impact the throughput of the received data. It should be apparent that the throughput of the received data would not be negatively impacted in this example if monitoring the paging channel (PCH) would result in cancellation of three or more timeslots, since the data would have already been lost.

When it is determined that the throughput is not negatively impacted, then the access terminal 800 can operate according to the conventional operations where the power measurements for the Idle mode subscription would be performed in connection with monitoring the paging channel on the Idle mode subscription. On the other hand, when it is determined that the throughput is negatively impacted, the access terminal 800 can schedule the power measurements for the one or more neighboring cells during at least one frame not intended for power measurements.

In the single subscription implementation, the processing circuit 802 (e.g., the power measurement module 808) executing the power measurement operations 814 can determine whether a power measurement can be performed during a radio block without negatively impacting transmission and/or reception of data. As described above, the impact to transmission and/or reception may depend on the modulation and coding scheme employed. When it is determined that the throughput is not negatively impacted, then the access terminal 800 can operate according to the conventional operations where the power measurements would be performed during scheduled timeslots in a radio block. On the other hand, when it is determined that the throughput is negatively impacted, the access terminal 800 can schedule the power measurements for the one or more neighboring cells during at least one frame not intended for power measurements.

At step 1208, the access terminal 800 performs a power measurement for at least one neighboring cell during at least one other frame, where the other frame is not intended for power measurements. For instance, the processing circuit 802 (e.g., the power measurement module 808) executing the power measurement operations 814 can perform a power measurement for one or more neighboring cells during one or more other frames not intended for power measurements. In some examples, the multiframe may be a 52-frame multiframe structure, and the one or more other frames not intended for power measurements may include an Idle frame and/or a Packet Timing Advance Control Channel (PTCCH) frame in the 52-frame multiframe. In other examples, the multiframe may be a 26-frame multiframe structure, and the one or more other frames not intended for power measurements may include an Idle frame and/or a Slow Associated Control Channel (SACCH) frame in the 26-frame multiframe.

When the access terminal 800 employs multiple subscriptions (e.g., multiple SIMs), and one is operating in a connected mode (Connected mode subscription) with another operating in an idle mode (Idle mode subscription), the processing circuit 802 (e.g., the power measurement module 808) executing the power measurement operations 814 may perform at least one power measurement for a neighboring cell associated with the Connected mode subscription and/or the Idle mode subscription. In some examples, the processing circuit 802 (e.g., the power measurement module 808) executing the power measurement operations 814 may remain time-locked to the network serving the Connected mode subscription when performing a power measurement for a neighboring cell associated with the Idle mode subscription. For instance, the processing circuit 802 (e.g., the power measurement module 808) executing the power measurement operations 814 may perform the power measurements for a neighboring cell associated with the Idle mode subscription during an Idle frame, a PTCCH frame, and/or a SACCH frame on the Connected mode subscription without changing the frame timing to the Idle mode subscription. The results from such a power measurement can be provided from the Connected mode subscription to the Idle mode subscription for use in reporting to the network associated with the Idle mode subscription.

By performing power measurements of neighboring cells during one or more frames not intended for power measurements, access terminals can avoid cancellation of reception and/or transmission timeslots. As a result, these timeslots can be used to continue wireless data transfers with the network and throughput can be maintained at a relatively high level.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11 and/or 12 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, and/or 7 may be configured to perform or employ one or more of the methods, features, parameters, or steps described in FIGS. 3, 4, 5, 6, 8, 9, 10 and/or 12. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:
1. An access terminal, comprising:
a communications interface; and
a processing circuit coupled to the communications interface, the processing circuit configured to:
transceive data in a current cell, via the communications interface, during one or more frames in a multiframe;

determine a number of timeslots for transmission or reception that will be likely cancelled due to a tune away to conduct a power measurement for at least one neighboring cell during a typical measurement frame;

determine whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds two timeslots when a current modulation and coding scheme of the access terminal is one of MCS-1, MCS-2, MCS-3, MCS-4, MCS-5, or MCS-6; and perform the power measurement for the at least one neighboring cell during at least one other frame instead of during the typical measurement frame in response to the determination that the number of timeslots for transmission or reception that will be likely cancelled due to the tune away exceeds two timeslots when the current modulation and coding scheme of the access terminal is one of MCS-1, MCS-2, MCS-3, MCS-4, MCS-5, or MCS-6.

2. The access terminal of claim 1, wherein the at least one neighboring cell is a neighboring cell associated with a Connected mode subscription.

3. The access terminal of claim 2, wherein the Connected mode subscription operates in at least one of a packet transfer mode, a dedicated mode, or a dual transfer mode.

4. The access terminal of claim 1, wherein the at least one neighboring cell is a neighboring cell associated with an Idle mode subscription.

5. The access terminal of claim 4, wherein the processing circuit is configured to perform the power measurement for the at least one neighboring cell associated with the Idle mode subscription while time-locked to a Connected mode subscription.

6. The access terminal of claim 4, wherein the at least one other frame not intended for power measurements comprises at least one frame in a Connected mode subscription not intended for power measurements of the at least one neighboring cell associated with the Idle mode subscription.

7. The access terminal of claim 1, wherein the at least one other frame not intended for power measurements comprises at least one frame from a group of frames in a 52-frame multiframe structure comprising an Idle frame and a Packet Timing Advance Control Channel (PTCCH) frame.

8. The access terminal of claim 1, wherein the at least one other frame not intended for power measurements comprises at least one frame from a group of frames in a 26-frame multiframe structure comprising an Idle frame and a Slow Associated Control Channel (SACCH) frame.

9. A method operational on an access terminal, comprising:
transceiving data in a current cell during one or more frames in a multiframe;
determining a number of timeslots for transmission or reception that will be likely cancelled due to a tune away to conduct a power measurement for at least one neighboring cell during a typical measurement frame;
determining whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds two timeslots when a current modulation and coding scheme of the access terminal is one of MCS-1, MCS-2, MCS-3, MCS-4, MCS-5, or MCS-6; and performing the power measurement for the at least one neighboring cell during at least one other frame instead of during the typical measurement frame in response to the determination that the number of timeslots for transmission or reception that will be likely cancelled due to the tune away exceeds two timeslots when the current modulation and coding scheme of the access terminal is one of MCS-1, MCS-2, MCS-3, MCS-4, MCS-5, or MCS-6.

10. The method of claim 9, wherein transceiving data during the one or more frames in the multiframe comprises:
receiving data, transmitting data, or receiving and transmitting data during the one or more frames in the multiframe.

11. The method of claim 9, wherein transceiving data during the one or more frames in the multiframe comprises transceiving data on a Connected mode subscription during the one or more frames in the multiframe, and further comprising: periodically monitoring a paging channel on an Idle mode subscription.

12. The method of claim 11, wherein performing the power measurement for the at least one neighboring cell comprises:
performing the power measurement for the at least one neighboring cell associated with the Idle mode subscription.

13. The method of claim 11, wherein performing the power measurement for the at least one neighboring cell during the at least one other frame not intended for power measurements comprises:
performing the power measurement for the at least one neighboring cell associated with the Idle mode subscription during the at least one other frame on the Connected mode subscription.

14. The method of claim 9, wherein performing the power measurement for the at least one neighboring cell during the at least one other frame not intended for power measurements comprises:
performing the power measurement for the at least one neighboring cell during an Idle frame, a Packet Timing Advance Control Channel (PTCCH) frame, or an Idle frame and a PTCCH frame in a 52-frame multiframe.

15. The method of claim 9, wherein performing the power measurement for the at least one neighboring cell during the at least one other frame not intended for power measurements comprises:
performing the power measurement for the at least one neighboring cell during an Idle frame, a Slow Associated Control Channel (SACCH) frame, or an Idle frame and a SACCH frame in a 26-frame multiframe.

16. An access terminal, comprising:
means for transceiving data in a current cell during one or more frames of a multiframe;
means for determining a number of timeslots for transmission or reception that will be likely cancelled due to a tune away to conduct a power measurement for at least one neighboring cell during a typical measurement frame;
means for determining whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds two timeslots when a current modulation and coding scheme of the access terminal is one of MCS-1, MCS-2, MCS-3, MCS-4, MCS-5, or MCS-6; and means for performing the power measurement for the at least one neighboring cell during at least one other frame instead of during the typical measurement frame in response to the determination that the number of timeslots for transmission or reception that will be likely cancelled due to the tune away exceeds two timeslots when the current modulation and coding scheme of the access terminal is one of MCS-1, MCS-2, MCS-3, MCS-4, MCS-5, or MCS-6.

17. The access terminal of claim 16, wherein the at least one neighboring cell is a neighboring cell associated with a Connected mode subscription.

18. The access terminal of claim 17, wherein the Connected mode subscription operates in at least one of a packet transfer mode, a dedicated mode, or a dual transfer mode.

19. The access terminal of claim 16, wherein the at least one neighboring cell is a neighboring cell associated with an Idle mode subscription.

20. The access terminal of claim 19, further comprising:
means for performing the power measurement for the neighboring cell associated with the Idle mode subscription from a Connected mode subscription.

21. The access terminal of claim 16, wherein the at least one other frame not intended for power measurements comprises an Idle frame, a Packet Timing Advance Control Channel (PTCCH) frame, or an Idle frame and a PTCCH frame in a 52-frame multiframe structure.

22. The access terminal of claim 16, wherein the at least one other frame not intended for power measurements comprises an Idle frame, a Slow Associated Control Channel (SACCH) frame, or an Idle frame and a SACCH frame in a 26-frame multiframe structure.

23. A non-transitory computer-readable medium having stored thereon processor-executable instructions configured to cause a processing circuit of an access terminal to perform operations comprising:
transceiving data in a current cell during one or more frames of a multiframe;
determining a number of timeslots for transmission or reception that will be likely cancelled due to a tune away to conduct a power measurement for at least one neighboring cell during a typical measurement frame;
determining whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds two timeslots when a current modulation and coding scheme of the access terminal is one of MCS-1, MCS-2, MCS-3, MCS-4, MCS-5, or MCS-6; and
performing the power measurement for the at least one neighboring cell during at least one other frame instead of during the typical measurement frame in response to the determination that the number of timeslots for transmission or reception that will be likely cancelled due to the tune away exceeds two timeslots when the current modulation and coding scheme of the access terminal is one of MCS-1, MCS-2, MCS-3, MCS-4, MCS-5, or MCS-6.

24. The non-transitory computer-readable medium of claim 23, wherein the stored processor-executable instructions are configured to cause the processing circuit of the access terminal to perform operations such that transceiving data during the one or more frames of the multiframe comprises transceiving data on a Connected mode subscription during one or more frames of the multiframe, and further wherein the stored processor-executable instructions are configured to cause the processing circuit of the access terminal to perform operations comprising periodically monitoring a paging channel on an Idle mode subscription.

25. The non-transitory computer-readable medium of claim 24, wherein the stored processor-executable instructions are configured to cause the processing circuit of the access terminal to perform operations such that performing the power measurement for the at least one neighboring cell comprises:
performing the power measurement for the at least one neighboring cell associated with the Idle mode subscription.

26. The non-transitory computer-readable medium of claim 24, wherein the stored processor-executable instructions are configured to cause the processing circuit of the access terminal to perform operations such that performing the power measurement for the at least one neighboring cell during the at least one other frame not intended for power measurement comprises:
performing the power measurement for the at least one neighboring cell during at least one other frame on the Connected mode subscription.

27. The non-transitory computer-readable medium of claim 23, wherein the stored processor-executable instructions are configured to cause the processing circuit of the access terminal to perform operations such that performing the power measurement for the at least one neighboring cell during the at least one other frame not intended for power measurements comprises:
performing the power measurement for the at least one neighboring cell during an Idle frame, a Packet Timing Advance Control Channel (PTCCH) frame, or an Idle frame and a PTCCH frame in a 52-frame multiframe.

28. The non-transitory computer-readable medium of claim 23, wherein the stored processor-executable instructions are configured to cause the processing circuit of the access terminal to perform operations such that performing the power measurement for the at least one neighboring cell during the at least one other frame not intended for power measurements comprises:
performing the power measurement for the at least one neighboring cell during an Idle frame, a Slow Associated Control Channel (SACCH) frame, or an Idle frame and a SACCH frame in a 26-frame multiframe.

29. An access terminal, comprising:
a communications interface; and
a processing circuit coupled to the communications interface, the processing circuit configured to:
transceive data via the communications interface during one or more frames in a multiframe;
determine a number of timeslots for transmission or reception that will be likely cancelled due to a tune away to conduct a power measurement for at least one neighboring cell during a typical measurement frame;
determine whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds one timeslot when a current modulation and coding scheme of the access terminal is one of MCS-7, MCS-8, or MCS-9; and perform the power measurement for the at least one neighboring cell during at least one other frame instead of during the typical measurement frame in response to the determination that the number of timeslots for transmission or reception that will be likely cancelled due to the tune away exceeds one timeslot when the current modulation and coding scheme of the access terminal is one of MCS-7, MCS-8, or MCS-9.

30. A method operational on an access terminal, comprising:

transceiving data in a current cell during one or more frames in a multiframe;

determining a number of timeslots for transmission or reception that will be likely cancelled due to a tune away to conduct a power measurement for at least one neighboring cell during a typical measurement frame;

determining whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds one timeslot when a current modulation and coding scheme of the access terminal is one of MCS-7, MCS-8, or MCS-9; and performing the power measurement for the at least one neighboring cell during at least one other frame instead of during the typical measurement frame in response to the determination that the number of timeslots for transmission or reception that will be likely cancelled due to the tune away exceeds one timeslot when the current modulation and coding scheme of the access terminal is one of MCS-7, MCS-8, or MCS-9.

31. An access terminal, comprising:

means for transceiving data in a current cell during one or more frames of a multiframe;

means for determining a number of timeslots for transmission or reception that will be likely cancelled due to a tune away to conduct a power measurement for at least one neighboring cell during a typical measurement frame;

means for determining whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds one timeslot when a current modulation and coding scheme of the access terminal is one of MCS-7, MCS-8, or MCS-9; and means for performing the power measurement for the at least one neighboring cell during at least one other frame instead of during the typical measurement frame in response to the determination that the number of timeslots for transmission or reception that will be likely cancelled due to the tune away exceeds one timeslot when the current modulation and coding scheme of the access terminal is one of MCS-7, MCS-8, or MCS-9.

32. A non-transitory computer-readable medium having stored thereon processor-executable instructions configured to cause a processing circuit of an access terminal to perform operations comprising:

transceiving data in a current cell during one or more frames of a multiframe;

determining a number of timeslots for transmission or reception that will be likely cancelled due to a tune away to conduct a power measurement for at least one neighboring cell during a typical measurement frame;

determining whether the tune away by the access terminal to conduct the power measurement for the at least one neighboring cell during at least one predefined timeslot of the typical measurement frame will interfere with reception of data, transmission of data, or both at the access terminal based on whether the number of timeslots for transmission or reception that will be likely cancelled due to the tune away exceeds one timeslot when a current modulation and coding scheme of the access terminal is one of MCS-7, MCS-8, or MCS-9; and performing the power measurement for the at least one neighboring cell during at least one other frame instead of during the typical measurement frame in response to the determination that the number of timeslots for transmission or reception that will be likely cancelled due to the tune away exceeds one timeslot when the current modulation and coding scheme of the access terminal is one of MCS-7, MCS-8, or MCS-9.

* * * * *